United States Patent
Skuliber et al.

(10) Patent No.: US 11,804,958 B2
(45) Date of Patent: Oct. 31, 2023

(54) METHOD AND SYSTEM FOR INITIAL SECRET DELIVERY FOR SCALABLE AND RESTART-ABLE COLLOCATED CONTAINERS WITH SHARED RESOURCES

(71) Applicant: Synchronoss Technologies, Inc., Bridgewater, NJ (US)

(72) Inventors: Ivan Skuliber, Dublin (IE); Ryan C. O'Hare, Morristown, NJ (US); Michael A. Bellomo, Nazareth, PA (US)

(73) Assignee: Synchronoss Technologies, Inc, Bridgewater, NJ (US)

( * ) Notice: Subject to any disclaimer, the term of this patent is extended or adjusted under 35 U.S.C. 154(b) by 149 days.

(21) Appl. No.: 17/137,479

(22) Filed: Dec. 30, 2020

(65) Prior Publication Data
US 2022/0209939 A1 Jun. 30, 2022

(51) Int. Cl.
*H04L 9/08* (2006.01)
*H04L 9/32* (2006.01)

(52) U.S. Cl.
CPC ............ *H04L 9/085* (2013.01); *H04L 9/0861* (2013.01); *H04L 9/0894* (2013.01); *H04L 9/3213* (2013.01)

(58) Field of Classification Search
CPC ..... H04L 9/085; H04L 9/0861; H04L 9/0894; H04L 9/3213
USPC ........................................................ 713/168
See application file for complete search history.

(56) References Cited

U.S. PATENT DOCUMENTS

| | | | | |
|---|---|---|---|---|
| 2013/0110658 | A1* | 5/2013 | Lyman | G06Q 20/36 705/41 |
| 2016/0134932 | A1* | 5/2016 | Karp | H04N 5/23222 348/207.11 |
| 2019/0268149 | A1* | 8/2019 | Kariv | H04L 9/0897 |
| 2019/0349357 | A1* | 11/2019 | Shukla | H04L 63/20 |
| 2020/0084027 | A1* | 3/2020 | Duchon | G06F 21/602 |
| 2020/0099522 | A1* | 3/2020 | Yang | H04L 9/3226 |

FOREIGN PATENT DOCUMENTS

CN 111783051 A 10/2020

OTHER PUBLICATIONS

Apr. 25, 2022—(WO) ISR and WO—App. No. PCT/US2021/065794.

* cited by examiner

*Primary Examiner* — Kambiz Zand
*Assistant Examiner* — Phuc Pham
(74) *Attorney, Agent, or Firm* — Banner & Witcoff, Ltd.

(57) ABSTRACT

A computer implemented method and system for secure initial secret delivery for collocated containers with shared resources techniques is disclosed. The method comprises providing an application type identifier and a token for accessing a secrets management service; creating asynchronously, a plurality of collocated containers with shared resources; initiating a request for a creation for an initial secret; validating the request, requesting an identity for the collocated containers; validating the identity; starting an application instance; and using the initial secret to retrieve other secrets for the application instance.

19 Claims, 3 Drawing Sheets

METHOD AND SYSTEM FOR INITIAL SECRET DELIVERY FOR SCALABLE AND RESTART-ABLE COLLOCATED CONTAINERS WITH SHARED RESOURCES

BACKGROUND OF THE INVENTION

Field of the Invention

Embodiments of the present invention generally relate to secure initial secret delivery, and more specifically to secure initial secret delivery for collocated containers with shared resources.

Description of the Related Art

An attack surface of a software environment is the sum of the different vectors' different points that have the potential to be exploited to allow an unauthorized user, generally referred to as an attacker, to gain access to the software environment (e.g., in order to enter or extract data from the environment). An attack vector is a method by which an attacker can gain access to a computer or network system for nefarious purposes. In other words, attack vectors are the various avenues an attacker can take, including the human element, to exploit a system. Keeping the attack surface as small as possible is a core principle of security practitioners.

Initial secret delivery, or delivery of secret zero is a well-known security challenge in cloud and distributed systems. The initial secret is the first secret that needs to be securely delivered to an application instance so the application instance can use it, typically during its bootstrapping, to obtain other secrets relevant to the application's execution. For security purposes, those other secrets are delivered directly into the application's memory space or within some protected memory space outside the application's memory space but where the application can access. Given the assumption that the deployment frameworks are trustworthy, and without focusing on insider threat (a threat persistent in all considered options), the key security challenge is to minimize the attack surface that an external attacker can exploit for accessing and reusing the initial secret as well as spoofing the initial secret delivery process. If an external attacker gets access to the initial secret or manages to spoof the initial secret delivery process, then the external attacker can gain access to other secrets.

Currently there are a number of different approaches for delivering the initial secret. However, present approaches, such as HashiCorp® offers approaches that are not cloud or deployment environment agnostic. An open-source community approach using HashiCorp's Vault®, is deployment and cloud environment agnostic and delivers only the initial secret to an application instance. Hence, it does not deliver all of the secrets, thus trying to minimize the attack surface. However, the open-source community approach collocates all the system parts needed for the initial secret delivery into a single virtual machine. As such, their approach has a large attack surface through which an external attacker can gain access to the initial secret or spoof the initial secret delivery process. Intuit® uses an approach using an Access Control System for issuing the initial secret to an application instance. However, in addition to not being deployment and cloud environment agnostic, after an external attacker manages to get into a container where an application instance is executed, the external attacker can intercept or spoof any step of the process. Ericsson® uses secret subunit metadata information, which is part of the container image, to deliver secrets into the container. In other words, it allows injection into a container via environment variables or files. With this approach the attack surface is large because if an external attacker gets into the container where an application instance is executed, the attacker has access to application secrets which are exposed in files or environment variables. Additional approaches have similar shortcomings and fail to adequately minimize the attack vectors.

Therefore, there is a need for a method for secure initial secret delivery for collocated containers with shared resources.

SUMMARY OF THE INVENTION

A system and/or method is provided for secure initial secret delivery for collocated containers with shared resources substantially as shown in and/or described in connection with at least one of the figures These and other features and advantages of the present disclosure may be appreciated from a review of the following detailed description of the present disclosure, along with the accompanying figures in which like reference numerals refer to like parts throughout.

While the method and system for secure initial secret delivery for collocated containers with shared resources is described herein by way of example for several embodiments and illustrative drawings, those skilled in the art will recognize that the method and system for secure initial secret delivery for collocated containers with shared resources is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and system for secure initial secret delivery for collocated containers with shared resources defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for a system and method for secure initial secret delivery for collocated containers with shared resources, according to embodiments of the invention. The disclosed system for secure initial secret delivery includes collocated containers, wherein the collocated containers include an application container where the application instance is located and executed, and an identity and authentication sidecar container which is used to securely obtain the identity of collocated containers from a secrets management service, as well as to securely obtain and deliver the initial secret from the secrets management service to the application instance in the application container. An externalized configuration server delivers a non-secret (i.e., plain text) configuration to the application instance. In interactions with secrets management service, the externalized configuration server amends the application's configuration with application secrets. The secrets management service generates a run-time identity for the collocated containers and an initial secret for the application instance. The secrets management service also stores and manages application secrets. The container orchestration and management system manages collocated containers and is either used for management and delivery of the container configuration relevant for the execution of the present disclosure or for the validation of container identifiers.

Methods of the invention represent just-in-time securely generating and delivering a run-time identity of collocated containers and to just-in-time securely generating and delivering an initial secret to the application container within collocated containers. Any container within the collocated containers (hence, including the application container) can be restarted at any time. If the restarted container is the application container, then methods of the invention securely and just-in-time generate and deliver a new initial secret to the application container. As such, the collocated containers can be scaled horizontally at any time. The disclosed methods minimize the attack surface and prevent an external attacker from interfering with the initial secret delivery process.

Various embodiments of a method and system for secure initial secret delivery for collocated containers with shared resources are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A container is a running instance of a container image, managed and executed by a container runtime. Each container has a unique identifier referred to as a container id, assigned by container runtime. A container image is an immutable, standalone and executable software package that includes application code and all relevant dependencies and settings. A container descriptor is a text document that contains all the commands needed to assemble a container image, including the entry point information that specifies what command or commands need to be executed in order for the container to start. Container runtime is software that executes containers and can manage local container images. A container registry provides a convenient and centralized means of storing and distributing container images. In some cases, it is not possible to create a software package that includes application code and all relevant dependencies and settings within a single container. In such cases, a superset called collocated containers is created. Collocated containers, referred to as a pod, are physically and logically collocated containers with shared resources like CPU, memory, network, file system, and the like. Collocated containers are orchestrated, managed and executed by a container orchestration and management system.

Figure 1:
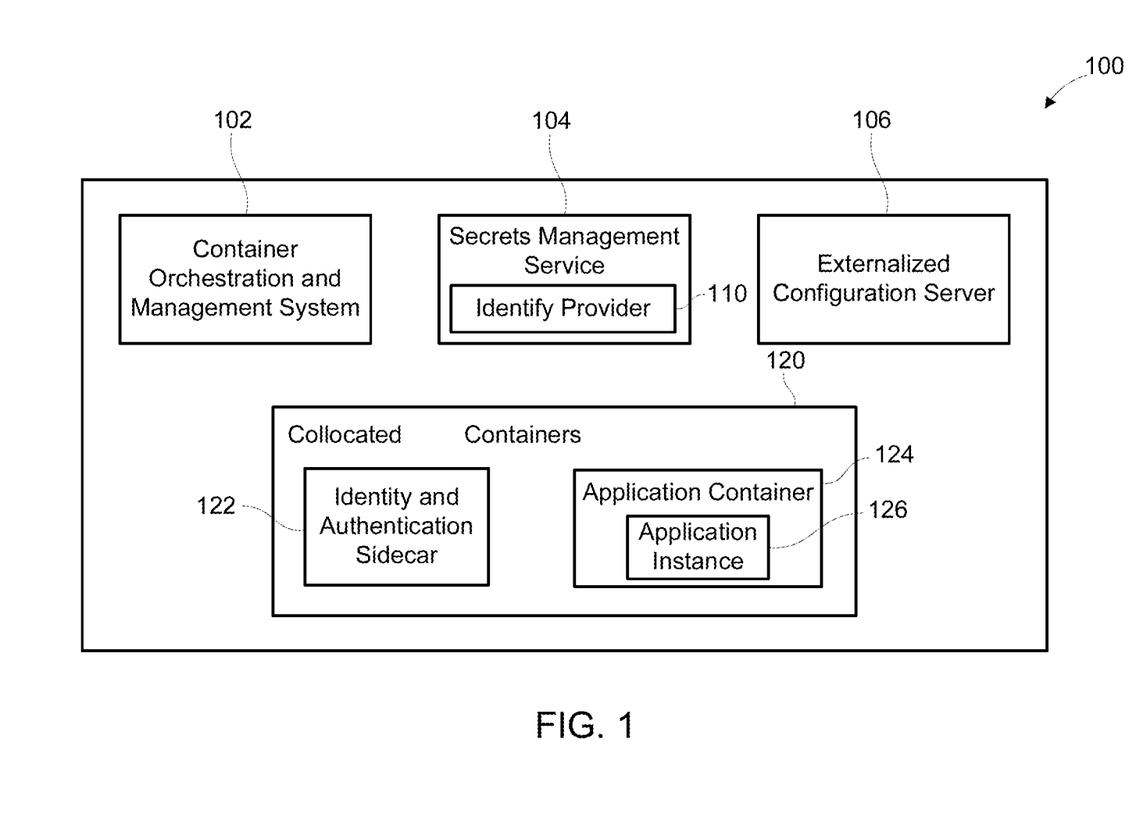
FIG. 1 depicts a block diagram of a system for secure initial secret delivery for collocated containers with shared resources, according to one or more embodiments of the invention.

FIG. 1 depicts a block diagram of a system 100 for secure initial secret delivery for collocated containers with shared resources, according to one or more embodiments of the invention. The system 100 includes a container orchestration and management system 102, a secrets management service 104, an externalized configuration server 106, and a plurality of collocated containers 120, wherein the plurality of collocated containers 120 includes at least an identity and authentication sidecar 122 and an application container 124. In some embodiments, the application container 124 may be split into multiple containers. [owls] The container orchestration and management system 102 orchestrates, manages, and executes the collocated containers 120. The container orchestration and management system 102 may be any container orchestration tool that allows management of multiple containers deployed across multiple host machines, such as Kubernetes®, DC/OS®, Docker Swarm®, Apache Mesos®, and the like.

The secrets management service 104 may be any secrets management solution such as HashiCorp Vault®, Amazon Web Services (AWS®) Secrets Manager, and the like. The secrets management service 104 includes an identity provider (IDP) 110. In some embodiments, the secrets management service 104 may use an external IDP that is a remote system used in conjunction with the secrets management service 104. The externalized configuration server 106 may be, for example a Spring Cloud® Configuration Server.

The container orchestration and management system 102 creates and starts the collocated containers 120. As part of creating the collocated containers 120, the container orchestration and management system 102 may inject additional configuration and data into the collocated containers or constituent parts of the collocated containers 120. Such configuration and data may include an application type identifier or token for accessing the secrets management service's identity provider. The application type identifier is metadata specifying a type of application that is present in the collocated containers 120. The token for accessing the IDP 110 is used for accessing identity related functionalities in the secrets management service 104. Alternatively, the token may be used by the secrets management service 104 for accessing an external IDP 110. For security purposes, the token for accessing secrets management service's IDP 110 is scoped to be valid only for accessing the identity provider's relevant functionalities and may have a limited time to live (TTL) validity or may be used for a limited number of application programming interface (API) requests.

The collocated containers 120 are physically and logically collocated and share resources such as CPU, memory, network, file system, and the like. The collocated containers 120 include at least two containers, specifically an identity and authentication sidecar 122 and an application container 124. The identity and authentication sidecar 122 obtains the identity of the collocated containers 120 from the secrets management service 104 after the collocated containers 120 are created by the container orchestration and management system 102. The identity of the collocated containers 120 is obtained before the application instance 126 is started, so the identity of the collocated containers 120 is obtained just-in-time in runtime. In some embodiments, the identity and authentication sidecar 122 may be injected by the container orchestration and management system 102 with the application identifier or token for accessing the identity provider 110. This injection is done in a secure manner such that only the identity and authentication sidecar has access to the injected data, using for example Kubernetes® Secrets, Configmap®, Secrets Volume®, or the like.

Since the identity and authentication sidecar 122 is not an application container 124, it does not expose ports external to the collocated containers 120. Therefore, an external attacker cannot directly gain access to the identity and authentication sidecar 122. In addition, since the identity and authentication sidecar 122 is a container, and containers are isolated from one another, if an external attacker gains access to the application container 124, for example by exploiting a vulnerability in the code of the application instance 126 running on the application container 124, the external attacker still cannot access the identity and authentication sidecar 122. As such, separating of the identity and authentication sidecar 122 and the application container 124, while keeping them still within the collocated containers 120 and collocated on the same computer host, as well as dedication of the identity and authentication sidecar 122 for obtaining the identity of the collocated containers and obtaining the initial secret for application container 124, results in minimization of the attack surface. In some embodiments identity and authentication sidecar 122 may be split into two containers within the collocated containers 120, where the first container is dedicated to obtaining the identity for the collocated containers 120 from secrets management service 104, and the second container is dedicated to obtaining the initial secret for application container 124 from the secrets management service 104.

The identity and authentication sidecar 122 requests the identity from the secrets management service 104. The identity request contains the application type identifier and token for accessing the secrets management service's IDP 110. The application type identifier and the token for accessing secret management service's IDP 110 may be received by identity and authentication sidecar 122, which is injected by the container and orchestration and management system 102 when the collocated containers (e.g., identity and authentication sidecar 122 and application container 124) are created. Upon validation of the token for accessing the IDP 110, and using the application type identifier, the secrets management service 104 generates an identity based on the application type. The identity uniquely identifies the collocated containers 120 and is delivered in the response from the secrets management service 104 for the identity and authentication sidecar 122. The identity and authentication sidecar 122 receives the response just-in-time.

Once the identity is obtained, the identity and authentication sidecar 122 obtains the initial secret for the application instance 126 in the application container 124, which happens just-in-time. The identity and authentication sidecar 122 requests the initial secret via an authentication request towards the secrets management service 104. The authentication request includes the identity that the identity and authentication sidecar 122 obtained from the secrets management service 104 and may contain a cryptographic nonce as an additional security measure. In embodiments where the nonce is used, the nonce is generated by the identity and authentication sidecar 122 in a cryptographically secure way. Upon receipt of authentication request by the secrets management service 104, the secrets management service 104, validates the authentication information (i.e. identity) provided in the request. If a nonce is provided in the request, an additional check is performed that the nonce has not already been used. If the authentication information is valid, the secrets management service 104 generates the initial secret according to policies associated with identity of the specific application type and returns the initial secret to the identity and authentication sidecar 122.

Policies associated with the identity of a certain application are defined as a part of the secrets management service 104 configuration. Policies define TTL of the initial secret or the number of uses allowed for the initial secret. Policies define the scope of access toward application secrets. This in turn allows each application type to have limited access to application secrets so the application type access secrets are relevant only for that application type and not any other application type. This is similar to authorization rights or role-based access where application type is authorized for access to a subset of secrets, or the application type corresponds to a role for which policies are defined. Policies further reflect a subtype of an application type, where the subtype typically denotes an environment where the application is deployed (e.g., development environment, prestaging environment, customer environment, and the like). Subtype information is a part of application meta-configuration and is provided as a part of the application bootstrapping process in order for application configuration for specific environment to be retrieved from externalized configuration server 106.

Upon receiving the initial secret, the identity and authentication sidecar 122 sends the initial secret to the application container 124. Communication between the identity and authentication sidecar 122 and the application container 124 is an intra collocated containers communication that is not visible to other containers, collocated containers or processes on a host where the collocated containers 120 are executed. For example, such a communication may be done via named pipe (i.e., inter-process-communication (IPC) first-in-first-out (FIFO) queue or via a mounted volume in Kubernetes®).

Upon reception of the initial secret, application container 124 proceeds with starting the application instance 126. During the bootstrapping of the application instance 126, the application instance 126 retrieves its externalized configuration and secrets. Typically, an application instance 126 in application container 124 requests its externalized configuration from the externalized configuration server 106 and receives said configuration in response to the request. In this scenario, the request contains the initial secret which is used by the externalized configuration server 106 to retrieve relevant secrets from the secrets management service 104 for the application instance 126.

The secrets management service 104 validates the request based on the presence of a valid initial secret. For security purposes, the externalized configuration server 106 does not persist secrets returned from the secrets management service 104 in response to the request. Thus, secrets returned from the secrets management service 104 are present only for a short time in the memory of the externalized configuration server 106 after receiving the response and until the completion of the configuration and secrets response. In some embodiments, the application instance in the collocated containers 120 may contact the secrets management service 104 directly (rather than send the request through the externalized configuration server 106) thereby bypassing the externalized configuration server 106. Bypassing the externalized configuration server 106 may be in order to refresh secrets originally obtained via the initial secret request, because externalized configuration server 106 is not able to communicate with secrets management service 104, or because some secrets must come directly to the application instance and must not traverse the externalized configuration server 106. If the collocated containers 120 send a secrets request directly to the secrets management service 104, then the request includes the obtained initial secret which is used by secrets management service 104 to validate the request for secrets.

Figure 2:
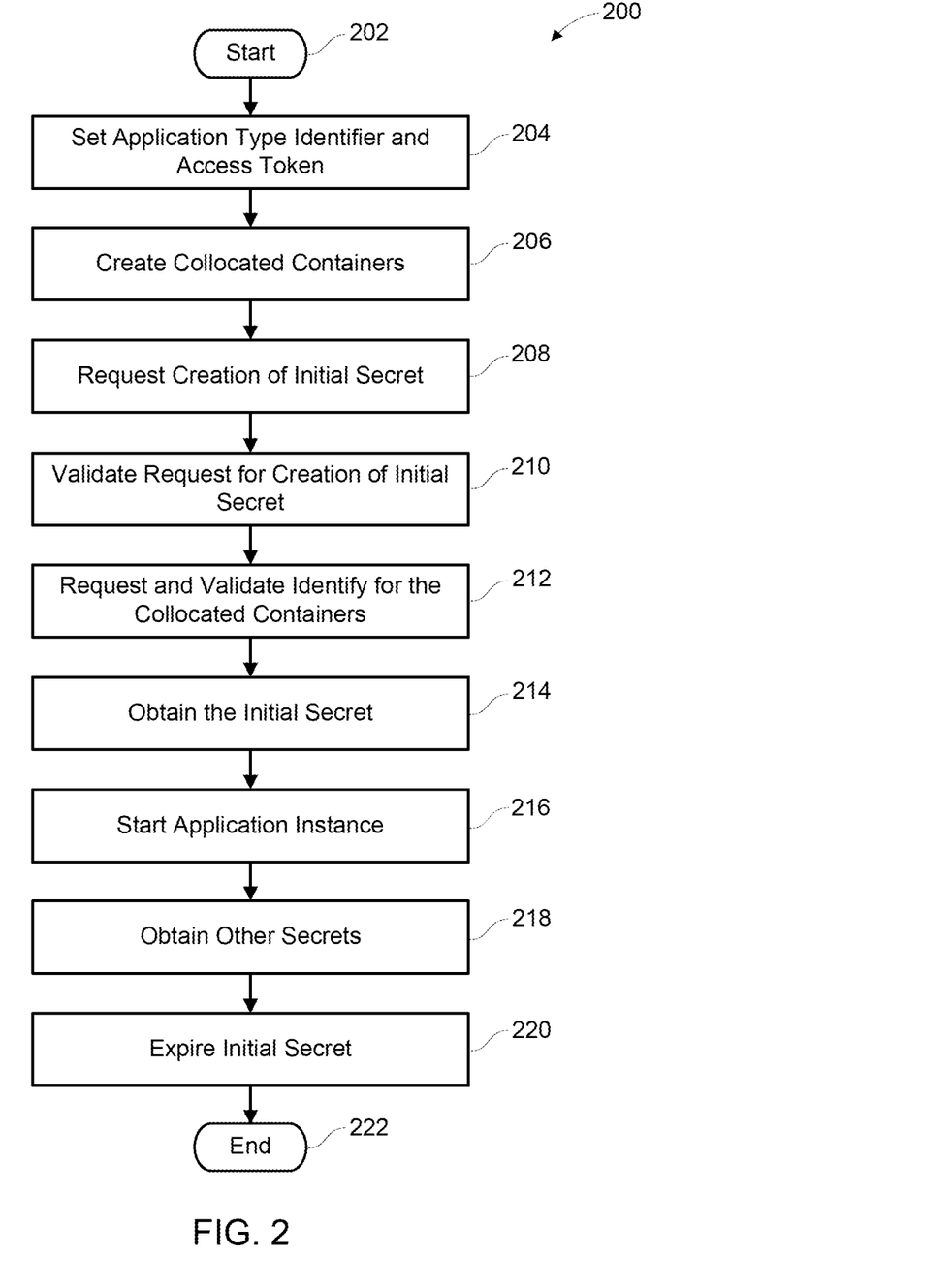
FIG. 2 depicts a flow diagram of a method for secure initial secret delivery for collocated containers with shared resources, according to one or more embodiments of the invention.

FIG. 2 depicts a flow diagram of a method 200 for secure initial secret delivery for collocated containers with shared resources, according to one or more embodiments of the invention. The method 200 uses a container orchestration and management system for secure configuration and delivery of an access token for the secrets management service's identity provider, and for secure configuration and delivery of an application type identifier. The method 200 starts at step 202 and proceeds to step 204.

At step 204, an application type identifier and an access token are provided to the container orchestration and management system. Prior to deployment or creation of any collocated containers with an application container, an operator or system such as a deployment pipeline (e.g., Spinnaker®) or a configuration management (e.g., Chef®) sets the application type identifier in the container orchestration and management system. For example, in Kubernetes®, Kubernetes Secrets® may be used, or alternatively, a ConfigMap® or a Secrets® Volume in conjunction with relevant collocated containers descriptor may be used to set the application type identifier. A new access token for accessing the secrets management's identity provider is obtained from the secrets management service and is sent to the container orchestration and management system. As with the application type identifier, for example, in Kubernetes®, Kubernetes Secrets® may be used for setting the token for accessing the secrets management service's identity provider, or alternatively, a ConfigMap® or a Secrets® Volume in conjunction with a relevant collocated containers descriptor may be used to set the access token.

It should be noted that, while the application type identifier is immutable during the existence of the application type, the token for accessing the secrets management's identity provider can be changed (i.e., refreshed) at any time. With the application type identifier and the token for accessing secrets management's identity provider set in the container orchestration and management system, it is possible to create or scale the application by creating or scaling collocated containers with the application container as a collocated containers constituting container.

At step 206, the collocated containers with shared resources are created. When creating the collocated containers, all constituting parts of the collocated containers are created asynchronously. Asynchronous creation allows for partial sequentialization or synchronization of container creation in collocated containers. Constituting parts of the collocated containers include at least (i) an identity and authentication sidecar, whose purpose is to obtain the initial secret for the collocated containers and obtain the identity for the application container, (ii) an application container, where the application instance's code executes, (iii) a sidecar in-memory volume, which is a dedicated in-memory volume that is mounted and used only in the identity and authentication sidecar and (iv) an in-memory volume between the application container and the sidecar that is a dedicated in-memory volume mounted and used for inter-container coordination and communication between the identity and authentication sidecar and the application container. The in-memory volume can be a named pipe (i.e., an IPC FIFO queue) between the identity and authentication sidecar and the application container, or an equivalent inter-process or inter-container communication construct.

When creating the identity and authentication sidecar, the container orchestration and management system performs all relevant container configuration according to information in the container descriptor (or as overridden in a collocated containers descriptor), including the mounting of sidecar in-memory volume and in-memory volume to the identity and authentication sidecar for communication between the identity and authentication side care and the application container, and mounting of application type identifier and token (as files) for accessing secrets management's identity provider from container orchestration and management system to sidecar in-memory volume. The container orchestration and management system then starts the identity and authentication sidecar asynchronously and independently of other containers in the collocated containers.

When creating the application container, the container orchestration and management system performs all relevant container configuration according to information in the container descriptor (or as overridden in collocated containers descriptor), including mounting of an in-memory volume to the application container for communication between the identity and authentication sidecar and the application container.

At step 208, the request for the creation of the initial secret is initiated. The container orchestration and management system starts the application container asynchronously and independently of other containers in collocated containers. After starting the application container, the container orchestration and management system executes (typically asynchronously), a container creation code hook that is specified as part of the collocated containers descriptor related to the application container. Container code hooks enable containers to be aware of events in their management lifecycle and run code when a lifecycle hook is executed. Container code hooks are managed and executed by the container orchestration and management system, respond to container's lifecycle events (e.g., creation, destruction) and execute code specified as part of the hook information. The container creation code hook, specified to be executed after the application container is created, sends a request for creating the initial secret to the in-memory volume (or named pipe). If the in-memory volume is a named pipe, then the request is a message; otherwise, the request is a file. This way of utilizing a container creation code hook is key to enabling the initial secret delivery when the application container restarts.

The identity and authentication sidecar is then started. Upon starting, the identity and authentication sidecar performs a never-ending continuous loop that polls the in-memory volume for a request for creating the initial secret. The request for creating the initial secret is issued by the container creation code hook of the application container after the application container is created or restarted. When the request is read by the loop, processing of the request begins.

At step 210, the request for the creation of the initial secret is validated. For security purposes, the request is immediately erased from the in-memory volume. All validations are performed using a readiness check on the application container (i.e., determine whether the application code can serve requests). If the readiness check fails, then the request is valid because the application instance is not yet started (and it should not be started if there is a request for creating an initial secret, considering that the initial secret is needed during the application instance's bootstrapping). If the readiness check succeeds, then the request is invalid because the application instance is already started (i.e. the application instance had to use the initial secret sometime prior in order for its bootstrapping to successfully complete), and such a condition merits sending a security alert. This validity check of the request for creating the initial secret minimizes the attack surface exploitable by a potential external attacker.

At step 212, the identity for the collocated containers is requested and validated. Following the passing of the validity check of the request, the identity and authentication sidecar reads the application type identifier and token for accessing secrets management's identity provider. Then, the identity and authentication sidecar obtains the identity for the collocated container from the secrets management service. The secrets management service generates a unique identity for the collocated container based upon the application type identifier. Request for the identity contains the token for accessing the secrets management service's identity provider which enables access to the secrets management service's functionality related to issuing identities. The secrets management service delivers the generated identity to the identity and authentication sidecar.

At step 214, the initial secret is obtained. After obtaining the identity, the identity and authentication sidecar obtains the initial secret for the application container. Using the identity, the identity and authentication sidecar sends an authentication request to the secrets management service, which validates the received identity. After successful validation of the identity, the secrets management service generates the initial secret according to policies associated with identity of certain application types, and sends the initial secret to the identity and authentication sidecar, at which time the identity and authentication sidecar writes the initial secret to the in-memory volume. The identity and authentication sidecar continues the aforementioned never-ending continuous loop to check if there is an initial secret to be read.

At step 216, the application instance is started. An application starting script is executed. The script starts with a one-off polling that checks if there is an initial secret in the in-memory volume. When there is an initial secret in the in-memory volume (which was written by the identity and authentication sidecar), it is read by the application container. For security purposes, the initial secret is immediately erased from the in-memory volume. Afterwards, the script executes the remainder of its code before the application instance is started.

At step 218, the initial secret is used for obtaining other secrets. When the application instance is started, the initial secret is used for obtaining secrets either directly from the secrets management service or indirectly as part of externalized configuration for the application instance which is retrieved from the externalized configuration server.

When obtaining secrets from the externalized configuration server, the externalized configuration, including secrets are obtained during the bootstrapping of the application instance using the initial secret. The application instance requests the configuration from the externalized configuration server. Upon receipt of the configuration request, the externalized configuration server assembles the configuration for the application instance that issued the request. A plain text configuration is assembled from a plain text configuration repository. Secrets are requested by the externalized configuration server from the secrets management service using the initial secret. The externalized configuration server does not persist the initial secret in any way, hence the initial secret is present in the externalized configuration server's memory in a transient manner. The secrets management service validates the initial secret, and issues a response with the secrets. As mentioned before, an application instance can have subtype information as a part of application meta-configuration. In such a scenario, the externalized configuration server may, per subtype, issue multiple requests for plaintext configurations (and receive multiple responses), and may issue multiple secrets requests (and receive multiple secrets responses). Assembled configuration for the application instance (that also includes secrets) is returned to the application instance in application container. Afterwards the application instance continues with its execution with the secrets in-memory.

At step 220, the initial secret is expired and the method 200 ends at step 222.

In some embodiments, the application identifier is configured as part of the identity and authentication container image (e.g., directly as a file in the container's file system, though this may be done indirectly via for example, Kubernetes® ConfigMap®). In such embodiments, after the request for creating the initial secret is validated, the identity and authentication sidecar needs only read the token for accessing the secrets management service's identity provider from the mounted sidecar in-memory volume, since the application type identifier is part of the identity and authentication sidecar container image.

In another embodiments, the container orchestration and management system is used by the secrets management service's identity provider for validation of identity and authentication sidecar container's identifier instead of having secure configuration and delivery of the access token for secrets management service's identity provider, while the application type identifier is securely configured in and delivered by the container orchestration and management system. In such embodiments, there is no possibilty of refreshing the token for accessing the secrets management service's identity provider. Furthermore, when the identity and authentication sidecar is created, only the application type identifier needs to be mounted as a file in the sidecar in-memory volume. The aforementioned differences significantly impact the processing done in the identity and authentication sidecar. After finding the request for creating the initial secret and performing the validity check of the request, processing in the identity and authentication sidecar continues with reading the application type identifier that is mounted as a file in the sidecar in-memory volume. Afterwards, there is no need to obtain the identity for the collocated containers with shared resources from the secrets management service because the identity and authentication sidecar container identifier is used as the identity which is validated with the container orchestration and management system. Since the container orchestration and management system created the collocated containers with shared resources, and the identity and authentication sidecar as well because the identity and authentication sidecar is a constituting container of the collocated containers with shared resources, the container orchestration and management system contains records for the created containers and their corresponding identifiers. It is still possible to perform an extra step of obtaining the identity for the collocated containers with shared resources from the secrets management service. However, from a security perspective, the obtained identity from the secrets management service does not yield better security characteristics considering the validation of the identity and authentication sidecar container identifier with the container orchestration and management system. Also, it should be noted that any container identifier of the collocated containers with shared resources constituting containers can be used for validation with the container orchestration and management system. So, the identity and authentication sidecar processing proceeds immediately to authentication with the secrets management service by using the identity and authentication sidecar container identifier and application type identifier. The secrets management service validates the application type identifier and determines which policies are associated with the application type identifier. The container identifier is validated with the container orchestration and management system. After the validation is successful, processing in the identity and authentication sidecar continues as above where the secrets management service returns a newly generated initial secret to the identity and authentication sidecar, and where the identity and authentication sidecar writes the obtained initial secret to the in-memory volume (or IPC FIFO queue) between the application container and the identity and authentication sidecar.

In yet another embodiment, the container orchestration and management system is used by secrets management service's identity provider for the validation of the identity and authentication sidecar container's identifier (i.e. instead of having the secure configuration and delivery of the access token for the secrets management service's identity provider), while the application type identifier is configured as part of the identity and authentication sidecar container. The application type identifier is set directly into container image of the identity and authentication sidecar. Furthermore, there is no possibility of refreshing the token for accessing the secrets management's identity provider. Also, since the application type identifier is a part of the identity and authentication sidecar container image, during the time of creating the identity and authentication sidecar, the only action the container orchestration and management system does regarding the embodiment is assigning the container identifier to the identity and authentication sidecar. The aforementioned differences significantly impact processing done in the identity and authentication sidecar. After finding the request for creating the initial secret and performing a validity check of the request, processing in the identity and authentication sidecar continues with reading the application type identifier from the identity and authentication sidecar container image. Afterwards, there is no need to obtain the identity for the collocated containers with shared resources from the secrets management service since the identity and authentication sidecar container identifier is used as the identity which is validated with the container orchestration and management system. In the present embodiment, the identity and authentication sidecar processing proceeds immediately to authentication with the secrets management service by using the identity and authentication sidecar's container identifier and application type identifier. The secrets management service validates the application type identifier and determines which policies are associated with the application type identifier. The container identifier is validated with the container orchestration and management system. After the successful validation, processing in the identity and authentication sidecar continues in the same manner as described above, where the secrets management service returns a newly generated initial secret to the identity and authentication sidecar, and the identity and authentication sidecar writes the obtained initial secret to the in-memory volume (or IPC FIFO queue) between the application container and the identity and authentication sidecar.

Figure 3:
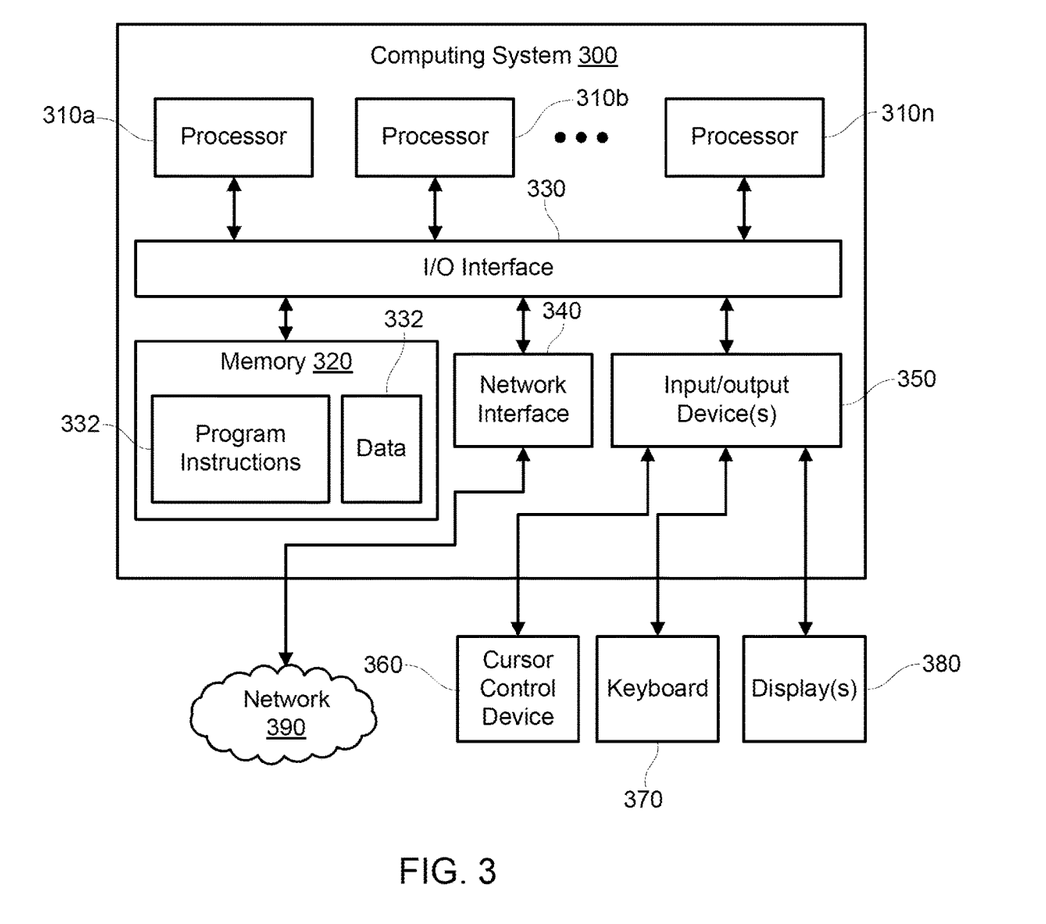
FIG. 3 depicts a computer system that can be utilized in various embodiments of the present invention to implement the computer and/or the display, according to one or more embodiments of the invention.

FIG. 3 depicts a computer system that can be used to implement the method of FIG. 2 in various embodiments of the present invention. Various embodiments of a method and system for secure initial secret delivery for collocated containers with shared resources, as described herein, may be executed on one or more computer systems, which may interact with various other devices. One such computer system is computer system 300 illustrated by FIG. 3, which may in various embodiments implement any of the elements or functionality illustrated in FIGS. 1-2. In various embodiments, computer system 300 may be configured to implement methods described above. The computer system 300 may be used to implement any other system, device, element, functionality or method of the above-described embodiments. In the illustrated embodiments, computer system 300 may be configured to implement method 200, as processor-executable executable program instructions 322 (e.g., program instructions executable by processor(s) 310) in various embodiments.

In the illustrated embodiment, computer system 300 includes one or more processors 310 coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of components may be utilized by the system to receive user input described above. In various embodiments, a user interface (e.g., user interface 330) may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs), such as the x96, PowerPC, SPARC, or MIPS ISAs, or any other suitable ISA. In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any suitable memory technology, such as static random access memory (SRAM), synchronous dynamic RAM (SDRAM), nonvolatile/flash-type memory, persistent storage (magnetic or solid state), or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the system, including network interface 340 or other peripheral interfaces, such as input/output devices 350, In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 350 may, in some embodiments, include one or more display terminals, keyboards, keypads, touch pads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the methods described above, such as the method illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for secure initial secret delivery for collocated containers with shared resources, comprising:
   receiving, by an identity and authentication sidecar, an application type identifier and a token to access a secrets management service, wherein the identity and authentication sidecar is a container in a plurality of collocated containers with shared resources;
   executing a container creation code hook on an application container, wherein the application container is a container in a plurality of collocated containers with shared resources;
   requesting, by the container creation code hook, a creation of an initial secret;
   continuously polling, by the identity and authentication sidecar, an in-memory volume between the identity and authentication sidecar and the application container to determine whether there exists a request for creating the initial secret;
   requesting validation of the request for the creation of the initial secret when a request for creating the initial secret is found;
   requesting, by the identity and authentication sidecar, an identity for the collocated containers using the application type identifier and the access token when the request for the creation of the initial secret is determined to be valid;
   receiving, by the identity and authentication sidecar, a unique identity for the collocated containers with shared resources based on the application type identifier;
   requesting validation of the unique identity for the plurality of collocated containers with shared resources;
   requesting, by the identity and authentication sidecar, the initial secret for the application container using the validated unique identity;
   starting an application instance in the application container; and
   retrieving other secrets for the application instance using the initial secret;
   wherein the container creation code hook is executed after the application container is created and wherein the container creation code hook sends a request for creating the initial secret to the in-memory volume or to a named pipe; and
   wherein if the in-memory volume is a named pipe, then the request is a message and if the in-memory volume is not a named pipe, the request is a file.

2. The method of claim 1, wherein the plurality of collocated containers with shared resources were created asynchronously.

3. The method of claim 1, wherein the identity and authentication sidecar is isolated from the application container.

4. The method of claim 1, further comprising:
   mounting a sidecar in-memory volume to the identity and authentication sidecar; and
   mounting the application type identifier and the access token to the sidecar in-memory volume.

5. The method of claim 1, further comprising deleting the request for the initial secret after the request is validated.

6. The method of claim 1, wherein validating the request for creating the initial secret comprises performing a readiness check on the application instance, wherein the request is determined to be invalid if the application instance is already started.

7. The method of claim 6, further comprising writing the initial secret to the in-memory volume between the identity and authentication sidecar and the application container.

8. The method of claim 7, wherein the other secrets are retrieved by an externalized configuration server from the secrets management service.

9. The method of claim 8, further comprising deleting the initial secret.

10. A system for secure initial secret delivery for collocated containers with shared resources between devices comprises:
    a plurality of collocated containers with shared resources, wherein the plurality of collocated containers comprises:
    an identity and authentication sidecar wherein the identity and authentication sidecar securely obtains the identity of the collocated containers from a secrets management service, and securely obtains and delivers the initial secret from the secrets management service to an application instance in an application container;
    an application container where the application instance is executed;
    a sidecar in-memory volume; and
    an in-memory volume between the identity and authentication sidecar and the application container;
    a container orchestration and management system comprising:
    a) at least one processor;

b) at least one input device; and
c) at least one storage device storing processor-executable instructions which, when executed by the at least one processor, perform a method including:
setting an application type identifier and a token for accessing a secrets management service;
creating the plurality of collocated containers with shared resources, wherein creating comprises:
starting an identity and authentication sidecar; and
starting an application container; and a secrets management service comprising:
a) at least one processor;
b) at least one input device; and
c) at least one storage device storing processor-executable instructions which, when executed by the at least one processor, perform a method including:
generating just-in-time, a unique run-time identity for a plurality of collocated containers with shared resources;
validating the unique identity for the plurality of collocated containers with shared resources;
just-in-time generating and delivering an initial secret for the application container; and
managing one or more application secrets for the application instance;
wherein the application container executes a container creation code hook that requests a creation of an initial secret;
wherein the container creation code book is executed after the application container is created and wherein the container creation code hook sends a request for creating the initial secret to the in-memory volume or to a named pipes; and
wherein if the in-memory volume is a named pipe, then the request is a message and if the in-memory volume is not a named pipe, then the request is a file.

11. The system of claim 10, wherein the container orchestration and management system creates the plurality of collocated containers with shared resources asynchronously.

12. The system of claim 10, wherein creating the plurality of collocated containers with shared resources by the container orchestration and management system further comprises:
mounting a sidecar in-memory volume to the identity and authentication sidecar; and
mounting the application type identifier and the access token to the sidecar in-memory volume.

13. The system of claim 10, wherein the identity and authentication sidecar continuously polls the in-memory volume between the identity and authentication sidecar and the application container to determine if there is a request for creating the initial secret.

14. The system of claim 10, wherein the identity and authentication sidecar requests validation of the request for the creation of the initial secret.

15. The system of claim 10, wherein the request for the initial secret is deleted after the request is validated.

16. The system of claim 10, wherein validating the request for creating the initial secret comprises performing a readiness check on the application instance, wherein the request is determined to be invalid if the application instance is already started.

17. The system of claim 16, wherein the identity and authentication sidecar writes the initial secret to the in-memory volume between the identity and authentication sidecar and the application container.

18. The system of claim 17, further comprising an externalized configuration server for providing a configuration for the application container during bootstrapping and retrieving other secrets from the secrets management service.

19. The system of claim 18, further comprising deleting the initial secret after the other secrets are retrieved.

* * * * *